US008473598B1

(12) United States Patent  
Piper (10) Patent No.: US 8,473,598 B1
(45) Date of Patent: Jun. 25, 2013

(54) SYSTEMS AND METHODS FOR MONITORING AND REPORTING ON VIRTUAL APPLICATION DELIVERY (75) Inventor: Benjamin Piper, Woodstock, GA (US)

(73) Assignee: McKesson Financial Holdings (BM)

( * ) Notice: Subject to any disclaimer, the term of this patent is extended or adjusted under 35 U.S.C. 154(b) by 78 days.

(21) Appl. No.: 13/075,449

(22) Filed: Mar. 30, 2011

(51) Int. Cl.
*G06F 15/16* (2006.01)
(52) U.S. Cl.
USPC .......................................... 709/223; 709/224
(58) Field of Classification Search
USPC .................................................. 709/223, 224
See application file for complete search history.

(56) References Cited

U.S. PATENT DOCUMENTS

| | | | |
|---|---|---|---|
| 5,628,530 A | 5/1997 | Thornton | |
| 6,012,035 A | 1/2000 | Freeman et al. | |
| 6,757,898 B1 | 6/2004 | Ilsen et al. | |
| 6,769,228 B1 | 8/2004 | Mahar | |
| 7,155,397 B2 | 12/2006 | Alexander et al. | |
| 8,078,577 B2 * | 12/2011 | Shlomai et al. | 707/610 |
| 2002/0002495 A1 | 1/2002 | Ullman | |
| 2002/0087583 A1 | 7/2002 | Morgan et al. | |
| 2002/0111832 A1 | 8/2002 | Judge | |
| 2002/0198831 A1 | 12/2002 | Patricelli et al. | |
| 2003/0009367 A1 | 1/2003 | Morrison | |
| 2003/0050799 A1 | 3/2003 | Jay et al. | |
| 2003/0149625 A1 | 8/2003 | Leonardi et al. | |
| 2003/0154163 A1 | 8/2003 | Phillips et al. | |
| 2003/0229540 A1 | 12/2003 | Algiene | |
| 2004/0039599 A1 | 2/2004 | Fralic | |
| 2004/0073457 A1 | 4/2004 | Kalies | |
| 2004/0078234 A1 | 4/2004 | Tallal, Jr. | |
| 2004/0117323 A1 | 6/2004 | Mindala | |
| 2004/0148198 A1 | 7/2004 | Kalies | |
| 2004/0249745 A1 | 12/2004 | Baaren | |

(Continued)

FOREIGN PATENT DOCUMENTS

| | | |
|---|---|---|
| CA | 2482370 | 3/2006 |
| WO | 9503569 | 2/1995 |
| WO | 0039737 | 7/2000 |
| WO | 2007025295 | 3/2007 |

OTHER PUBLICATIONS

Sampson, R.J., Taking Control of Health Care Costs, Best's Review—Life Health Insurance Edition, Nov. 1983, pp. 64-66, vol. 84, Issue 7, USA.

(Continued)

*Primary Examiner* — Adnan Mirza
(74) *Attorney, Agent, or Firm* — Sutherland Asbill & Brennan LLP (57) ABSTRACT

Embodiments include systems and methods for systems and methods for displaying an electronic document on multiple output devices. In one embodiment, a method may include acquiring session data associated with a remote access server for a user; acquiring session data associated with at least one server that provides virtual application delivery services to a plurality of remote devices associated with a user account; acquiring disconnect data associated with the least one server providing virtual application delivery services to the plurality of remote devices associated with the user account; updating a session file associated with the user account and a disconnect file associated with the user account with the acquired session data and disconnect data, respectively; acquiring parameters to define, at least in part, a report that presents both session data and disconnect data in a single presentation; and generating the report for the user account based at least in part on the parameters and the session file and disconnect file.

16 Claims, 7 Drawing Sheets

U.S. PATENT DOCUMENTS

| | | | |
|---|---|---|---|
| 2005/0015280 A1 | 1/2005 | Gabel et al. | |
| 2005/0060201 A1 | 3/2005 | Connely, III et al. | |
| 2005/0102169 A1 | 5/2005 | Wilson | |
| 2005/0154627 A1 | 7/2005 | Zuzek et al. | |
| 2005/0187793 A1 | 8/2005 | Myles | |
| 2005/0197862 A1 | 9/2005 | Paterson et al. | |
| 2005/0240473 A1 | 10/2005 | Ayers, Jr. et al. | |
| 2005/0288972 A1 | 12/2005 | Marvin et al. | |
| 2006/0020514 A1 | 1/2006 | Yered | |
| 2006/0026041 A1 | 2/2006 | Ullman | |
| 2006/0149784 A1 | 7/2006 | Tholl et al. | |
| 2006/0184391 A1 | 8/2006 | Barre et al. | |
| 2006/0259363 A1 | 11/2006 | Jhetam et al. | |
| 2007/0005402 A1 | 1/2007 | Kennedy et al. | |
| 2007/0050209 A1 | 3/2007 | Yered | |
| 2007/0136100 A1 | 6/2007 | Daugherty et al. | |
| 2007/0233525 A1 | 10/2007 | Boyle | |
| 2007/0233526 A1 | 10/2007 | Hoffman et al. | |
| 2007/0239493 A1 | 10/2007 | Sweetland et al. | |
| 2012/0203895 A1* | 8/2012 | Jaudon et al. | 709/224 |

OTHER PUBLICATIONS

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, pp. 128-132. vol. 63, Issue 1, USA.

Anonymous, TechRx Announces Successful Beta Deployment of T-Rex. PR Newswire. May 13, 2002.

* cited by examiner

SYSTEMS AND METHODS FOR MONITORING AND REPORTING ON VIRTUAL APPLICATION DELIVERY

FIELD OF THE INVENTION

Aspects of the invention relate generally to managing virtual application delivery, and more specifically, to systems and methods for monitoring and reporting on virtual application delivery sessions.

BACKGROUND OF THE INVENTION

Information systems are often critical to the operation of an enterprise. They must be secure and reliable, and available at all times, especially if they support customer-facing or mission-critical applications. These and other requirements have led many enterprises to adopt virtual application delivery solutions to provide access to an application running at a centralized data center by essentially any remote device. For example, a data center may host one or more virtual applications for remote access by employees or customers, and in doing so the applications can be maintained centrally, easily scaled to an enterprise's needs, and efficiently managed to provide substantial cost savings.

Virtual application delivery solutions may require specialized software and hardware, which are often paid for on a per session basis. That is, each time a user remotely accesses a virtual application, a charge may be incurred for that session. Further, due to any number of factors, users conducting a remote hosting session are occasionally disconnected. The communication link established between the remote device and the data center hosting the virtual application may be lost, and while the user may establish a new communication link with the data center to continue accessing the virtual application under the same session license, the user experience may be negatively impacted. Thus, it may be helpful to store and review disconnect data on a regular basis to troubleshoot disconnect issues.

While some virtual application delivery solutions provide reporting tools, such tools often lack the detail and versatility desired. For example, certain reporting tools suffer from one or more of the following deficiencies: inability to represent session count and disconnect count in a single graph, inability to integrate with existing server monitoring scripts, inability to provide adequate report customization, and requirement of a specialized database application.

Thus, there is an opportunity for systems and methods for monitoring and tracking session data to add value to a virtual application delivery solution.

SUMMARY OF THE INVENTION

Some or all of the above needs and/or problems may be addressed by certain embodiments of the invention. Embodiments of the invention may include systems and methods for monitoring or reporting on remote hosting sessions. In one embodiment, there is a computer-implemented method. The method may include: acquiring session data associated with a remote access server for a user; acquiring session data associated with at least one server that provides virtual application delivery services to a plurality of remote devices associated with a user account; acquiring disconnect data associated with the at least one server providing virtual application delivery services to the plurality of remote devices associated with the user account; updating a session file associated with the user account and a disconnect file associated with the user account with the acquired session data and disconnect data, respectively; acquiring parameters to define, at least in part, a report that presents both session data and disconnect data in a single presentation; and generating the report for the user account based at least in part on the parameters and the session file and disconnect file. One or more of the prior steps may be performed by one or more computer processors.

According to another embodiment of the invention, there is a system. The system may include at least one memory operable to store computer-executable instructions, and at least one processor configured to access the at least one memory. The at least one processor may be further configured to execute the computer-executable instructions to: acquire session data associated with at least one server that provides virtual application delivery services to a plurality of remote devices associated with a user account; acquire disconnect data associated with the at least one server providing virtual application delivery services to the plurality of remote devices associated with the user account; and update a session file associated with the user account and a disconnect file associated with the user account with the acquired session data and disconnect data, respectively; acquire parameters to define, at least in part, a report that presents both session data and disconnect data in a single presentation; and generate the report for the user account based at least in part on the parameters and the session file and disconnect file.

Other systems, methods, apparatuses, features, and aspects according to various embodiments of the invention will become apparent with respect to the remainder of this document.

BRIEF DESCRIPTION OF THE DRAWINGS

Reference will now be made to the accompanying drawings, which are not necessarily drawn to scale, and wherein.

DETAIL DESCRIPTION

Example embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers referred to like elements throughout.

System Overview

Figure 1:
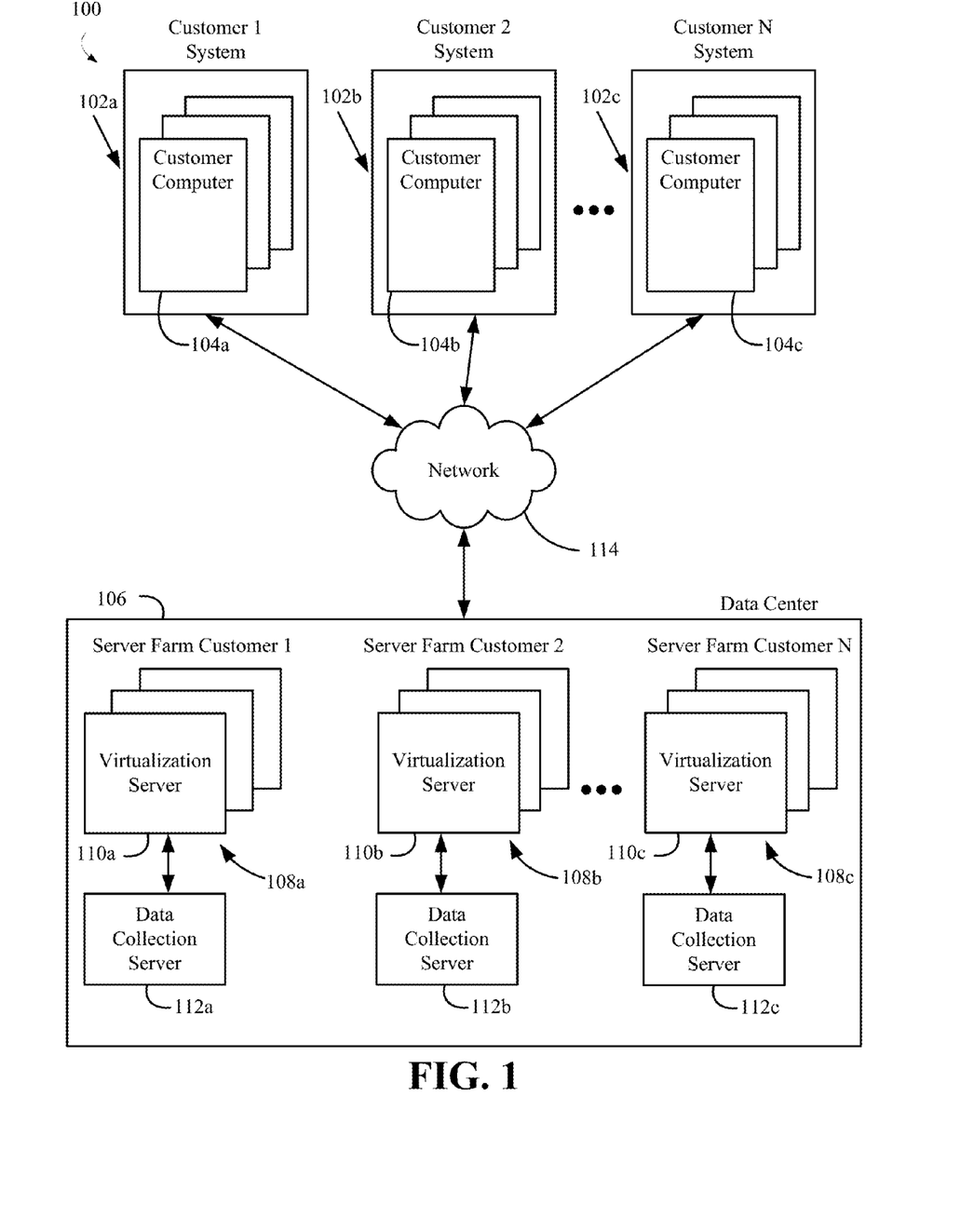
FIG. 1 illustrates an example virtual application delivery system, according to an example embodiment of the invention.

FIG. 1 illustrates an example virtual application delivery system 100 for providing virtual access to one or more applications remotely located on centralized servers, according to an example embodiment of the invention. As shown in FIG. 1, the system 100 may include one or more customer systems 102a, 102b, and 102c, each having one or more customer computers 104a, 104b, 104c, respectively. The system 100 may also include a data center 106. The data center 106 may include one or more server farms 108a, 108b, 108c, each server farm being dedicated to a customer system. Each server farm 108a, 108b, 108c may comprise one or more virtualization servers 110a, 110b, 110c, respectively. In addition, associated with each server farm 108a, 108b, 108c may be a data collection server 112a, 112b, 112c respectively. Each of the customer computers 104a-104c, virtualization servers 110a-110c, and data collection servers 112a-112c is configured for accessing and reading associated computer-readable media having stored data thereon and/or computer-executable instructions for implementing the various methods described herein. Generally, network devices and the systems, including one or more customer computers 104a-104c, virtualization servers 110a-110c, and data collection servers 112a-112c, have hardware and/or software for transmitting and receiving data and/or computer-executable instructions over a communication link and at least one memory for storing data and/or computer-executable instructions. These network devices and systems may also include a processor for processing data and exchanging computer-executable instructions, as well as other internal and peripheral components that are well-known in the art. As used herein, the term "computer-readable media" may describe any form of computer memory or memory device.

As shown in FIG. 1, the customer systems 102a-102c and data center 106 may be in communication with each other via a network 114, which as described below can include one or more separate or shared private and/or public networks, including the Internet. Each of these components—the customer systems 102a-102c, the virtualization servers 110a-c and the data collection servers 112a-c—will now be discussed in further detail.

First, each customer system may be associated with a different entity or company, and dedicated to each customer system may be a server farm at the data center, wherein each server farm may include one or more virtualization servers. Residing on one or more of the virtualizations servers may be a virtualized application(s) that a user associated with a customer computer may virtually access. The user does this by establishing a virtual session between the customer computer and one of the virtualization servers associated with the server farm dedicated to that customer.

Figure 2:
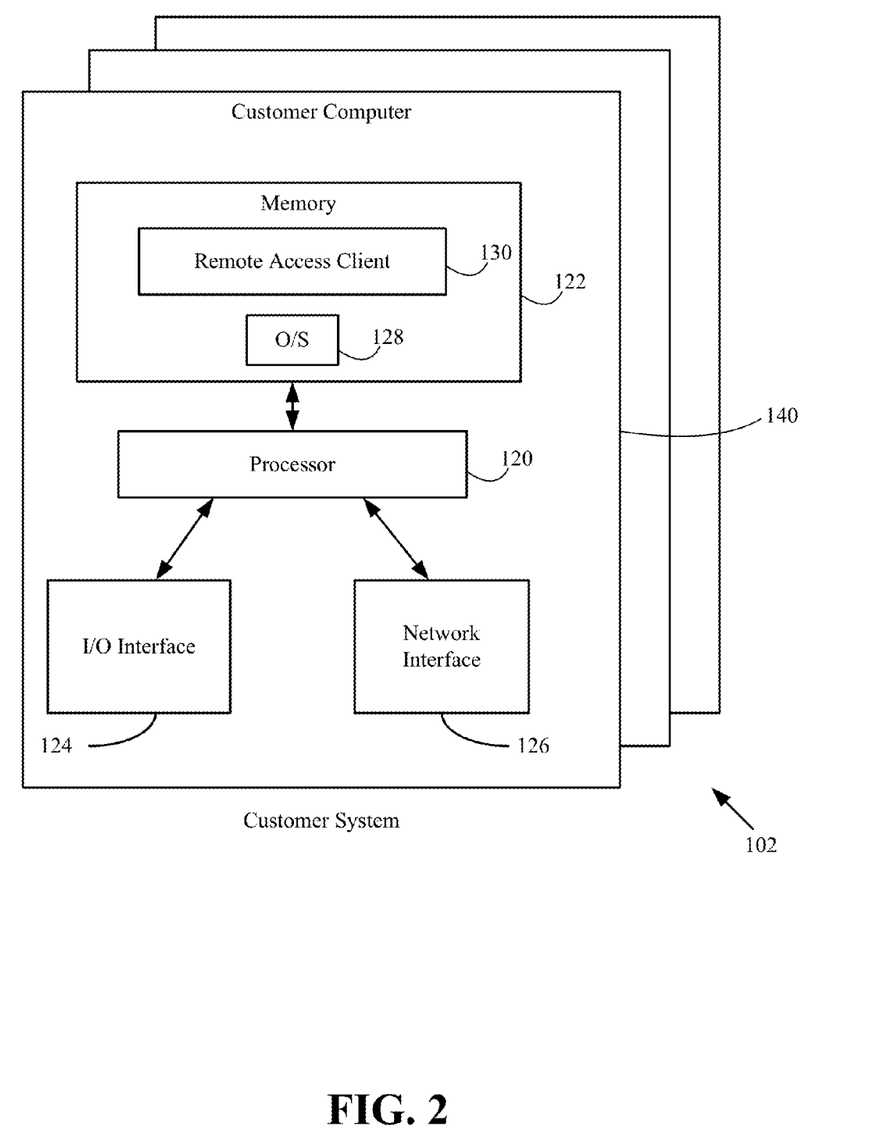
FIG. 2 illustrates an example customer system, according to an example embodiment of the invention.

With reference to FIG. 2, by way of example, a customer system 102, according to an embodiment of the invention, may include one or more customer computers 104. The customer computer 104 may be any processor-driven device, such as, but not limited to, a server computer, a mainframe computer, one or more network computers, a desktop computer, a personal computer, a laptop computer, a mobile computer, a handheld portable computer, a digital assistant, a personal digital assistant, a digital tablet, an internet appliance, or any other processor-based device. In addition to having a processor(s) 120, the customer computer 104 may further include a memory 122, input/output (I0") interface(s) 124, and network interface(s) 126. The memory 122 may be any computer-readable media, coupled to the processor(s) 120, such as RAM, ROM, and/or a removable storage device in a database management system ("DBMS") to facilitate management of data files and other data stored in the memory 120 and/or stored in separate databases (not shown). The memory 120 may store data files in various program modules, such as an operating system ("OS") 128 and a remote access client 130. The OS 128 may be, but is not limited to, Microsoft Windows®, Apple OSX™, Linux, Unix, or a mainframe operating system. The remote access client 130 may be configured as a plug-in to an Internet browser or a dedicated application running on a customer computer 104, such as a native application. Thus, the remote access client 130 can be launched from a shortcut icon, hyperlink, browser bookmark, etc., to initiate a session with a virtualization server within the dedicated server farm for that customer.

For example, a customer, such as hospital or other healthcare provider, may utilize the remote access client 130 to establish a communication link with a virtualization server 110 via the network 114 for maintaining a virtual application session on the virtualization server 110. The data collection server 112 associated with the server farm may monitor and manage the session between the customer computer 104 and the virtualization server 110.

Figure 3:
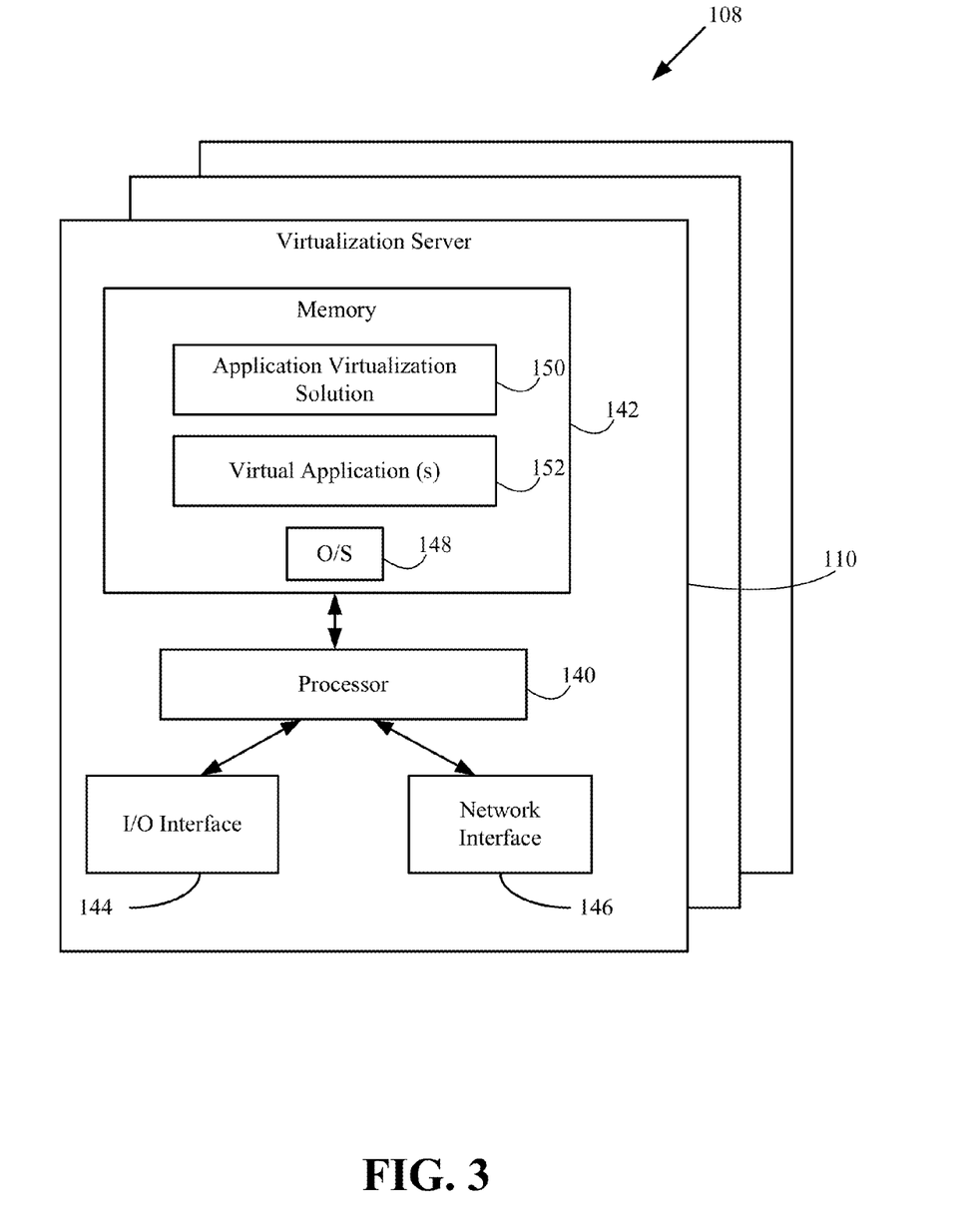
FIG. 3 illustrates an example virtualization server, according to an example embodiment of the invention.

With reference to FIG. 3, the server farm 108, which may be dedicated to a particular customer system 102, includes one or more virtualization servers 110. The virtualization server 110 may include, but is not limited to, any processor or processor-driven device that is configured for hosting one or more applications for a virtual access by a customer computer 104. The virtualization server 110 may include, but is not limited to, a server computer, a mainframe computer, one or more network computers, or any other processor-based device. The virtualization server 110 may include processor(s) 140, a memory 142, input/output ("I/O") interface(s) 144, and network interface(s) 146. The memory 142 may be any computer-readable medium, coupled to the processor(s) 140, such as RAM, ROM, and/or a removable storage device for storing data files in a database management system ("DBMS") to facilitate management of data files and other data stored in the memory 142 and/or stored in one or more databases (not shown) associated with virtualization server 110. The memory 142 may also store various program modules, such as an operating system ("OS") 148, an application virtualization solution 150, and one or more virtual application(s) 152. The OS 148 may be, but is not limited to, Microsoft Windows®, Apple OSX™, Linux, Unix, or a mainframe operating system. The application virtualization solution 150 communicates with the remote access client 130 of the customer computer 104 to establish a communication link between the customer computer 104 and the virtualization server 110. Over the communication link a virtual application session may be established. The application virtualization solution 150 manages the user's access to and utilization of the virtual applications 152. The application virtualization solution 150 may be, but is not limited to, Citrix XenApp, Citrix Presentation Server, Citrix MetaFrame, NoMachine NX, and Ericom PowerTerm WebConnect. The virtual application(s) 152 accessed by customer computer 104 are installed and maintained at a central location, such as the data center 106, for efficient utilization by customer computers 104.

Figure 4:
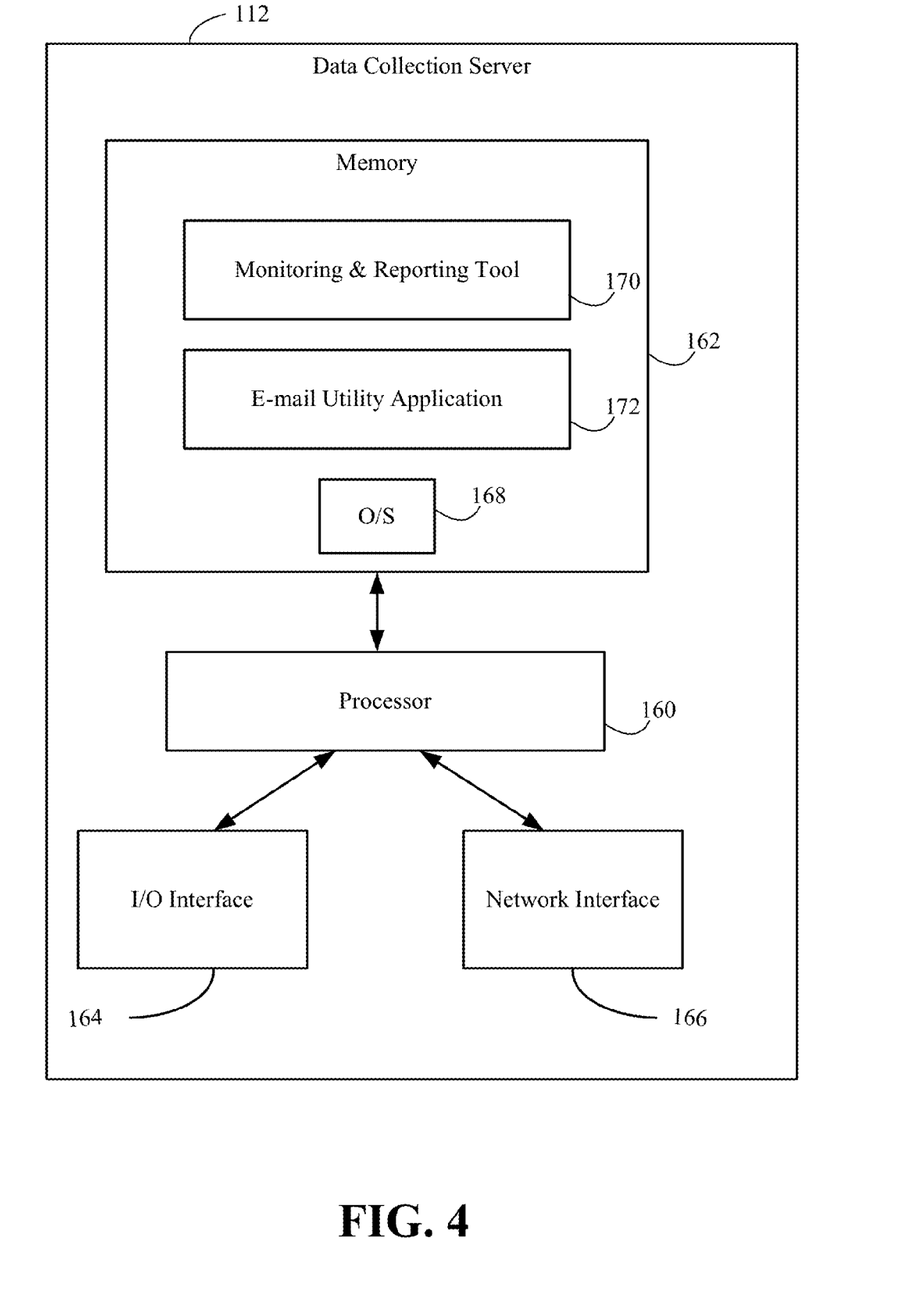
FIG. 4 illustrates an example data collection server, according to an example embodiment of the invention.

With reference to FIG. 4, the data collection server 112 may be assigned or dedicated to a particular server farm 108, and may manage session data for each virtualization server in a given server farm. The data collection server 112 may include, but is not limited to, any processor or processor-driven device that is configured for managing and/or monitoring operations of a server farm, which may be assigned or dedicated to a single customer system having one or more customer computers. For example, the data collection server 112 may monitor session-related data on each of the virtualization servers within the server farm, including session time, session disconnects, session state, server connection selection, server load, and printer mappings. The data collection server 112 may include, but is not limited to, a server computer, a mainframe computer, one or more networked computers, or any other processor-based device.

The data collection server 112 may include the processor(s) 160, a memory 162, input/output ("I/O") interface 164, and a network interface 166. The memory 162 may be any computer-readable medium, coupled to the processor(s) 160, such as a RAM, ROM, and/or a removable storage device for storing data files in a database management system ("DBMS") to facilitate management of data files and other data stored in the memory 162 and/or stored in one or more databases (not shown) associated with the data collection server 112. The memory 162 may also store various program modules, such as an operating system ("OS") 168, a monitoring and reporting tool 170 and an e-mail utility application 172. The OS 168 may be, but is not limited to, Microsoft Windows®, Apple OSX™, Linux, Unix or a mainframe operating system. The monitoring and reporting tool 170 may access session data for each of the virtualization servers within the server farm to which it is assigned or dedicated, and then generate desired reports based thereon. For example, session data such as the number of virtual sessions initiated on each of the virtualization servers within a predetermined period of time and/or the number of session disconnects at each of the virtualization servers within that same predetermined period of time, may be collected by the monitoring and reporting tool 170. The monitoring and reporting tool 170 may then generate a graphical presentation based on the collected data. The presentation may then be displayed or output.

For illustrative purposes, the monitoring and reporting tool 170 may be implemented with a reporting application such as RRDTool, an open-source round-robin database reporting tool, and command line scripts. A first script may be utilized to collect the desired session data, such as session count data and disconnect count data, from a data collection server 112 and then update files with the desired data. If the data collection server 112 is assigned or dedicated to a server farm, and that server farm is assigned or dedicated to a customer system, that is, a customer, then the data collected is customer-specific data, which may be particularly useful. A second script may be utilized to initiate the operation of the reporting application, such as the RRDTool, and to provide predefined parameters needed by the reporting tool for generating a graphical presentation of the collected data. For example, with the RRDTool, the second script may define the following parameters: site (the site name printed on the graphical presentation), e-mail to (e-mail address when the output presentation will be sent), e-mail from (the e-mail address the e-mail utility application will identify as the sender), SMTP server (the IP address of the SMTP server that will deliver the e-mail), subject (the subject line for the e-mail), and body (the body of the e-mail). With the parameters set and the data files updated with the collected data, the reporting application can then generate a graphical presentation of the data, which in the illustrated case includes both session count data and disconnect data. An example graphical presentation is set forth as graph 180 in FIG. 5.

The e-mail utility application 172 may then be utilized by the monitoring and reporting tool 170 to automatically generate an e-mail for delivering the generated graphical presentation to a predetermined recipient. A suitable e-mail utility application may be BLAT, which is an open-source command line SMTP mailer solution.

The network 114 may include any telecommunication and/or data network, whether public, private, or a combination thereof, including a local area network, a wide area network, an intranet, an internet, the Internet, intermediate handheld data transfer devices, a publicly switched telephone network ("PSTN"), and/or any combination thereof, and may be wired and/or wireless. Due to network connectivity, various methodologies as described herein may be practiced in the context of distributed computing environments.

Those of ordinary skill in the art will appreciate that the system 100 shown in and described with respect to FIG. 1 is provided by way of example only. Numerous other operating environments, system architectures, and device configurations are possible. Currently, the embodiments of the invention should not be construed as being limited to any particular operating environment, system architecture, or device configuration.

Operational Overview

Figure 6:
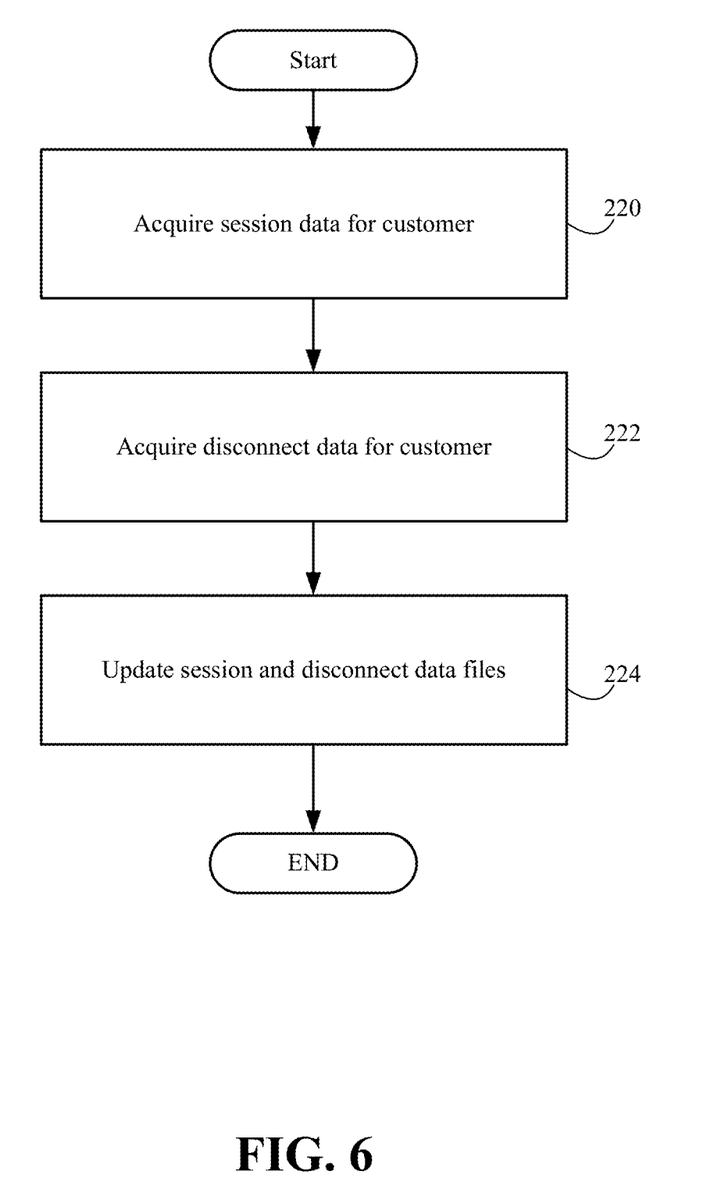
FIG. 6 illustrates an example flow diagram for acquiring session and disconnect data and establishing corresponding data files, according to an example embodiment of the invention.
Figure 7:
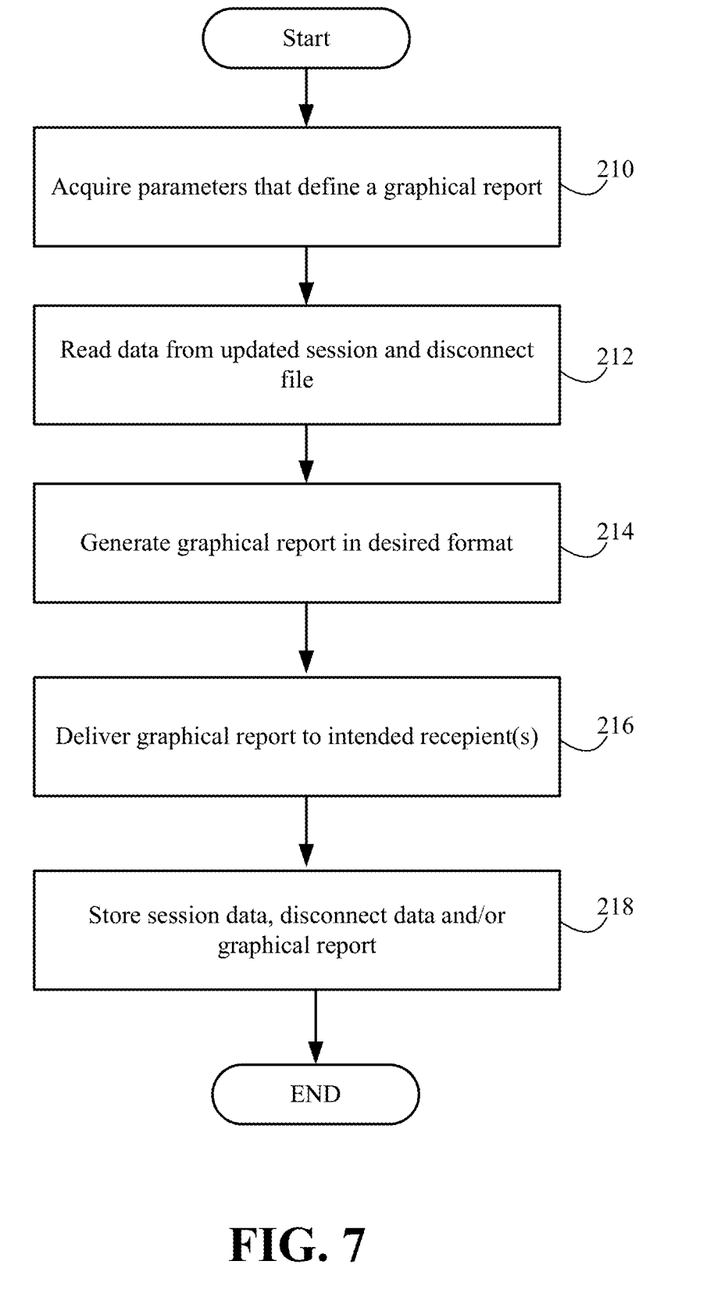
FIG. 7 illustrates an example flow diagram for generating a session count and session disconnect count on a per-customer basis, according to an example embodiment of the invention.

FIGS. 6 and 7 provide illustrative flow diagrams of the operation of the monitoring and reporting tool 170 of the data collection server 112, according to an embodiment of the invention. FIG. 6 may set forth steps implemented by a first script, and may be scheduled to run periodically, such as every 15 minutes. FIG. 7 may set forth the steps implemented by a second script, and also may be scheduled to run periodically, such as every 15 minutes. While set forth in the illustrative embodiment as separate scripts, it will be appreciated by one of ordinary skill in the art that the two scripts can be integrated together, and may be further integrated with a reporting application.

With reference to FIG. 6, at block 200, the monitoring and reporting tool acquires session data, such as session count data, from each virtualization server in the server farm to which it is assigned. The session data acquired may include, but is not limited to, total session count, time stamp data, and disconnected session count. By having server farms assigned or dedicated to certain customers, the data acquired by the monitoring and reporting tool may be client-specific. This information may be particularly useful because each session is often associated with a session license, and billing for virtual application delivery is often based on the number of licenses used. That is, each session may require a single session license, and each license has a certain cost associated with it. Similarly, at block 202, the monitoring and reporting tool acquires disconnect count data from each virtualization server in the server farm to which it is assigned. While a user may re-establish a disconnected communication link under the same session license, disconnect data provides useful information about network performance and health. For example, disconnect data may be particularly useful if a certain customer is receiving more disconnects at a certain time of day or from a certain customer computer. The disconnect data acquired may include, but is not limited to, disconnected session count, time stamp data, and total session count. At block 204, the acquired data may be used to update data files with session data and disconnect data. For example, one file may contain the most current session count data, and another file may contain the most current disconnect count data.

Figure 5:
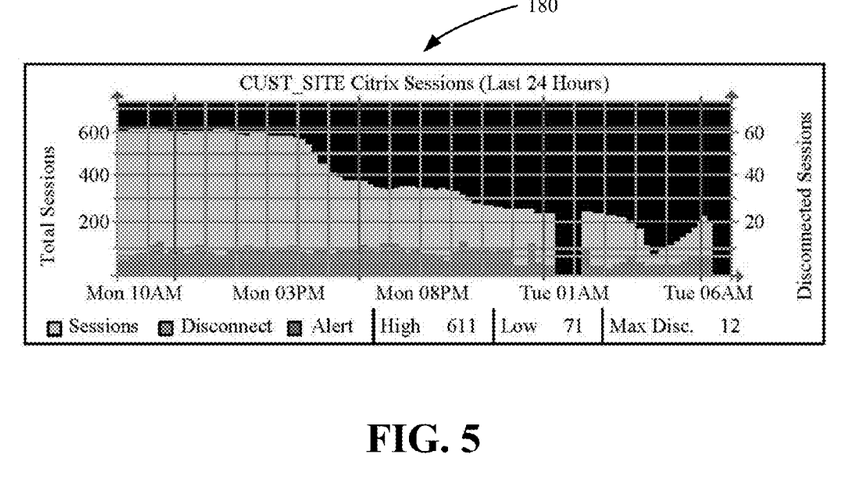
FIG. 5 is an example graph of session count and disconnect count in a single presentation, according to an example embodiment of the invention.

With reference to FIG. 7, at block 210, the parameters for defining the graphical presentation of the acquired data are collected. This may include, but is not limited to, the following: site (the site name printed on the graphical presentation), e-mail to (e-mail address where the output presentation will be sent), e-mail from (the e-mail address the e-mail utility application will identify as the sender), SMTP server (the IP address of the SMTP server that will deliver the e-mail), subject (the subject line for the e-mail), and body (the body of the e-mail). In addition, the files containing the updated data are identified. At block 212, the data from the updated files is read. This data may represents the session count and disconnect count for a single customer. At block 214, the reporting application takes the parameters and the data from the updated files and generates a graphical report depicting both session count data and disconnect count data, as illustrated in FIG. 5. At block 216, the graphical presentation may be automatically sent to a designated recipient(s) such as by e-mail, facsimile, or other suitable means. Further, at block 218, the graphical presentation and/or the associated data may be stored locally or remotely for archival purposes.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

It will also be appreciated that each of the I/O interfaces described herein may facilitate communication between a processor and various I/O devices, such as a keyboard, mouse, printer, microphone, speaker, monitor, bar code reader/scanner, RFID reader, and the like. Likewise, each of the network interfaces described herein may take any of a number of forms, such as a network interface card, a modem, a wireless network card, and the like.

It will further be appreciated that while certain computers have been illustrated herein as a single computer or processor, the illustrated computers may actually be comprised of a group of computers or processors, according to an example embodiment of the invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method, comprising:
    acquiring session count data associated with at least one server that provides virtual application delivery services to a plurality of remote devices associated with a user account;
    acquiring disconnect count data associated with the at least one server providing virtual application delivery services to the plurality of remote devices associated with the user account;
    updating a session file associated with the user account and a disconnect file associated with the user account with the acquired session count data and disconnect count data, respectively;
    acquiring parameters to define, at least in part, a report comprising a graphical display of both the session count data and disconnect count data in a single graphical display; and
    generating the report comprising the graphical display for the user account based at least in part on the parameters and the session file and disconnect file;
    wherein one or more of the prior steps are performed by one or more computer processors.

2. The method of claim 1, wherein the acquired session count data and acquired disconnect count data are for a predetermined period of time.

3. The method of claim 1, wherein acquiring the session count data includes obtaining the number of sessions initiated at the at least one server by the plurality of remote devices.

4. The method of claim 1, wherein acquiring the disconnect count data includes obtaining the number of communication links supporting a session between the plurality of remote devices and the at least one server that are disconnected.

5. The method of claim 1, wherein updating the session file and disconnect file includes writing the acquired session count data to the session file and the acquired disconnect count data to the disconnect file.

6. The method of claim 1, wherein the at least one server comprises at least one Citrix server dedicated to the user account.

7. The method of claim 1, wherein the user account is associated with a customer.

8. The method of claim 1, wherein the parameters include at least one or more of user name, report recipient address, report sender address, report e-mail subject, report e-mail body, report attachment, and address of an e-mail server for sending the reporting e-mail.

9. A system, comprising:
at least one memory for storing computer-executable instructions;
at least one processor in communication with the at least one memory, wherein the at least one processor is configured to execute the computer-executable instructions to:
acquire session count data associated with at least one server that provides virtual application delivery services to a plurality of remote devices associated with a user account;
acquire disconnect count data associated with the at least one server providing virtual application delivery services to the plurality of remote devices associated with the user account;
update a session file associated with the user account and a disconnect file associated with the user account with the acquired session count data and disconnect count data, respectively;
acquire parameters to define, at least in part, a report comprising a graphical display of both the session count data and the disconnect count data in a single graphical display; and
generate the report comprising the graphical display for the user account based at least in part on the parameters and the session file and disconnect file.

10. The system of claim 9, wherein the acquired session count data and acquired disconnect count data are for a predetermined period of time.

11. The system of claim 9, wherein the session count data includes the number of sessions initiated at the at least one server by the plurality of remote devices.

12. The system of claim 9, wherein the disconnect count data includes the number of communication links supporting a session between the plurality of remote devices and the at least one server that are disconnected.

13. The system of claim 9, wherein the one processor is configured to execute the computer-executable instructions to write the acquired session count data to the session file and the acquired disconnect count data to the disconnect file.

14. The system of claim 9, wherein the at least one server comprises at least one Citrix server dedicated to the user account.

15. The system of claim 9, wherein the user account is associated with a customer.

16. The system of claim 9, wherein the parameters include at least one or more of user name, report recipient address, report sender address, report e-mail subject, report e-mail body, and address of an e-mail server for sending the reporting e-mail.

* * * * *